(12) United States Patent
Autie et al.

(10) Patent No.: US 11,378,616 B2
(45) Date of Patent: Jul. 5, 2022

(54) METHOD FOR PRODUCING A CIRCUIT WHICH IS OPTIMIZED FOR PROTECTION AGAINST RADIATION

(71) Applicant: SAFRAN ELECTRONICS & DEFENSE, Paris (FR)

(72) Inventors: Cédric Autie, Paris (FR); Thibault Porteboeuf, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/734,483
(22) PCT Filed: Jun. 17, 2019
(86) PCT No.: PCT/EP2019/065919
§ 371 (c)(1),
(2) Date: Dec. 2, 2020
(87) PCT Pub. No.: WO2019/243278
PCT Pub. Date: Dec. 26, 2019

(65) Prior Publication Data
US 2021/0247441 A1 Aug. 12, 2021

(30) Foreign Application Priority Data
Jun. 21, 2018 (FR) .................................... 18 55484

(51) Int. Cl.
*G01R 31/28* (2006.01)
*G01R 31/3185* (2006.01)
(Continued)

(52) U.S. Cl.
CPC ......... *G01R 31/2881* (2013.01); *G01C 21/16* (2013.01); *G01R 31/318519* (2013.01); *G06F 30/337* (2020.01)

(58) Field of Classification Search
None
See application file for complete search history.

(56) References Cited

U.S. PATENT DOCUMENTS 5,859,884 A * 1/1999 Metro ...................... G21C 7/36
376/259
7,948,065 B1 * 5/2011 Maher ..................... H01L 24/29
257/660
(Continued)

OTHER PUBLICATIONS

Baloch S et al., "Design of a Novel Soft Error Mitigation Technique for Reconfigurable Architectures", 2006 IEEE Aerospace Conference; Big Sky, Montana; Mar. 4-11, 2006, IEEE Operations Center, Piscataway, NJ,Mar. 4, 2006, pp. 1-9 (XP-010928636) (ISBN: 9780780395459).

*Primary Examiner* — Jermele M Hollington
(74) *Attorney, Agent, or Firm* — Muncy, Geissler, Olds & Lowe, P.C.

(57) ABSTRACT

A production method for producing a circuit optimized to be protected against radiation includes a preliminary characterization stage performed on a reference circuit. The preliminary characterization stage includes the steps of: irradiating the reference circuit a plurality of times; after each irradiation, if one or more reference elements of the reference circuit have failed, locating said reference element(s); and mapping the impact of the irradiations on the reference surface of the reference circuit. The production method further includes an optimization stage comprising the step of adapting the position of at least one optimized radiation-sensitive element on at least one optimized surface of the optimized circuit as a function of the mapping performed on the reference circuit.

15 Claims, 14 Drawing Sheets

(51) Int. Cl.
*G01C 21/16* (2006.01)
*G06F 30/337* (2020.01)

(56) References Cited

U.S. PATENT DOCUMENTS

| | | | |
|---|---|---|---|
| 8,507,861 B2* | 8/2013 | Girones | G01T 7/00 |
| | | | 250/336.1 |
| 9,054,684 B1 | 6/2015 | Sood et al. | |
| 10,534,878 B1* | 1/2020 | Bai | G01R 31/2882 |
| 2012/0180005 A1 | 7/2012 | Lilja | |
| 2013/0305199 A1* | 11/2013 | He | G06F 30/34 |
| | | | 716/104 |
| 2015/0363517 A1 | 12/2015 | Clark et al. | |

* cited by examiner

METHOD FOR PRODUCING A CIRCUIT WHICH IS OPTIMIZED FOR PROTECTION AGAINST RADIATION

The invention relates to the field of production methods for producing a circuit that is optimized for protection against radiation.

BACKGROUND OF THE INVENTION

In space, a field programmable gate array (FPGA) is subjected to a space radiation environment that results from several phenomena, including cosmic radiation, solar flares, and solar wind.

Likewise, in the atmosphere, an FPGA is subjected to an atmospheric radiation environment that results in particular from the interaction of cosmic radiation with atoms of the atmosphere. By way of example, such an FPGA is thus exposed to heavy ions, to neutrons, to protons, and to photons, all resulting from natural radiation.

In space or in the atmosphere, an FPGA may also be subjected to artificial radiation.

It is possible that such particles or such photons disturb the FPGA and, in particular, that they produce single event upsets (SEUs) in the memory elements of the FPGA. These memory elements may be of various kinds, e.g. flip-flop bistables, latch bistables, or random access memory (RAM) locations. Bit values of data previously sampled by the memory elements are then inverted.

Particles and photons coming from natural or artificial radiation thus tend to reduce the robustness of the FPGA and thus of the electrical equipment in which the FPGA is incorporated. By way of example, the electrical equipment may be an inertial measurement unit of a space launcher.

One existing mechanism for correcting this type of disturbance consists in triplicating sensitive bistables, and in associating the three triplicated bistables with a majority voter. The outputs of the bistables are corrected from the results of the vote taken by the voter. This is referred to as "local triple modular redundancy". That mechanism operates very well, providing only one bistable among the three bistables is in error. Below in this document, the term "TMR cell" is used to designate a triple modular redundancy cell comprising a set of three triplicated bistables and a voter.

Nevertheless, it is possible for a single particle to hit two bistables in the same TMR cell, and thus corrupt its operation. This is referred to herein as a "multiple bit upset" (MBU).

It is therefore relatively complicated to guarantee that an FPGA (and thus electrical equipment incorporating the FPGA) complies with a requirement to withstand natural or artificial radiation, or on the contrary, complies with a requirement not to withstand natural or artificial radiation. Guaranteeing compliance with a requirement not to withstand radiation is advantageous for electrical equipment that is designed especially for a radiation-free environment: this avoids misuse of said electrical equipment.

In order to guarantee that an FPGA complies with this type of requirement, attempts have been made to characterize the impact of radiation on the radiation-sensitive elements of the FPGA (such as the above-mentioned bistables).

In order to characterize the impact of radiation on an FPGA or on electrical equipment in which the FPGA is incorporated, it is known to carry out simulations of the FPGA or of the electrical equipment on the basis in particular of physical geometrical models of the FPGA or of the electrical equipment.

On the basis of a three-dimensional model and of the composition of materials used for manufacturing the FPGA, a Monte Carlo method is used for statistically simulating the passage of a large number of particles. For each trajectory that is modelled, the physical effects on the FPGA are also simulated. In-depth knowledge of the underlying physical processes makes it possible to estimate which trajectories produce errors and to determine the effect of geometry on the impact of radiation on the sensitive elements.

Such simulations make use of models that are extremely complex and of simulation times that are very long for a result that is expensive and difficult to obtain, difficult to use, and difficult to confirm experimentally. Furthermore, such simulations require accurate technical information about the FPGA, which is rarely accessible.

OBJECT OF THE INVENTION

An object of the invention is to improve the robustness of a circuit against natural or artificial radiation, and to be in a position to guarantee such robustness.

SUMMARY OF THE INVENTION

In order to achieve this object, there is provided a production method for producing a circuit optimized for protection against radiation, the production method including a preliminary characterization stage performed on a reference circuit comprising at least one reference surface on which radiation-sensitive reference elements are distributed, the preliminary characterization stage comprising the steps of:
  irradiating the reference circuit a plurality of times;
  after each irradiation, if one or more reference elements of the reference circuit have failed, locating said reference element(s); and
  mapping the impact of the irradiations on the reference surface of the reference circuit;
the production method further including an optimization stage comprising the step of adapting the position of at least one optimized radiation-sensitive element on at least one optimized surface of the optimized circuit as a function of the mapping performed on the reference circuit.

The irradiations and the mapping performed on the reference circuit serves to characterize accurately the impact of radiation on the reference elements of the reference circuit, and also on any circuit that presents characteristics close to the reference circuit. For example, the results can be applied directly to all circuits that belong to the same family of components as a reference circuit, i.e. to components from the same designer and based on the same ASIC fabrication technology and the same choice of architectures. By way of nonlimiting example, mention may be made of the FPGA components of a given family, i.e. those based on the same architecture and the same fabrication method, but having different die sizes, for example. It is also possible to mention central processor unit (CPU) or system on chip (SoC) components based on the same architecture and on the same fabrication method. Finally, mention may also be made of proprietary ASIC circuits based on a common library of standard cells and on the same fabrication technology.

The positions of the optimized elements of the optimized circuit are thus adapted on the basis of the results of the mapping in order to improve the robustness of the functions performed by the optimized elements.

This improves the robustness of the optimized circuit and this robustness can be guaranteed, since the preliminary characterization stage is performed on a reference circuit having real characteristics that are similar to those of the optimized circuit. Guaranteeing robustness is particularly advantageous for optimized circuits that are included in electrical circuits that need to be subjected to certification activities (as applies to aviation and space applications).

There is also provided an optimized circuit produced by using the above-described production method.

There is also provided an electric circuit card including an optimized circuit as described above.

There is also provided an inertial measurement unit including an electric circuit card as mentioned above, and also a navigation system including the inertial measurement unit.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

In this example, the production method of the invention is for producing a circuit that is optimized for protection against natural and artificial radiation.

In this example, the optimized circuit is an FPGA of the IGLOO2 family manufactured by the component manufacturer Microsemi. Selecting this component serves to illustrate the invention in this example, but nevertheless does not restrict its scope from applying to other logic components of FPGA, of complex programmable logic device (CPLD), of application-specific integrated circuit (ASIC), etc. type. In particular, the invention is equally applicable to other FPGAs, including in particular, but not limited to, components from Xilinx, Intel/Altera, Microsemi, Lattice. Likewise, the invention is equally applicable to circuits using other etching widths or designed using foundry methods other than IGLOO2.

The IGLOO2 FPGA is manufactured with 65 nanometer (nm) etching. The tool used for the placement and routing of the FPGA is a placement and routing tool of the Libero family.

The logic layer of the FPGA, which is made on silicon, presents an optimized surface that is subdivided into numerous zones. In this example, each zone is defined as including one logic group (or "cluster"). In this example, each logic group comprises twelve flip-flop bistables, twelve lookup tables (LUTs), and twelve buffers.

The logic layer of the FPGA also comprises routing resources, which include global signal routing resources. In this example, the global signals comprise clock signals and reset signals.

The global signal routing resources comprise global buffers and row global buffers.

In this example, there are eight global buffers (where this number depends on the size of the FPGA, and certain FPGAs in the same family have sixteen). Each global buffer is a multiplexer that generates an independent global signal. It can be controlled from various sources, e.g. from an external clock or from an internal logic signal.

The row global buffers are situated on two vertical strips within the FPGA. Each row global buffer controls the logic groups situated both in a branch to the left of the row global buffer, and also in a branch to the right of it.

When routing the FPGA, the global signals coming from the global buffers are routed to the row global buffers. The global signals then reach the logic groups via row global signals coming from the row global buffers.

Each global buffer has access to all of the row global buffers. Each row global buffer is independent and may also be controlled by internal logic signals.

The logic groups may also be controlled by internal logic signals that are referred to as "inter-cluster" signals and that are not global signals.

Figure 1:
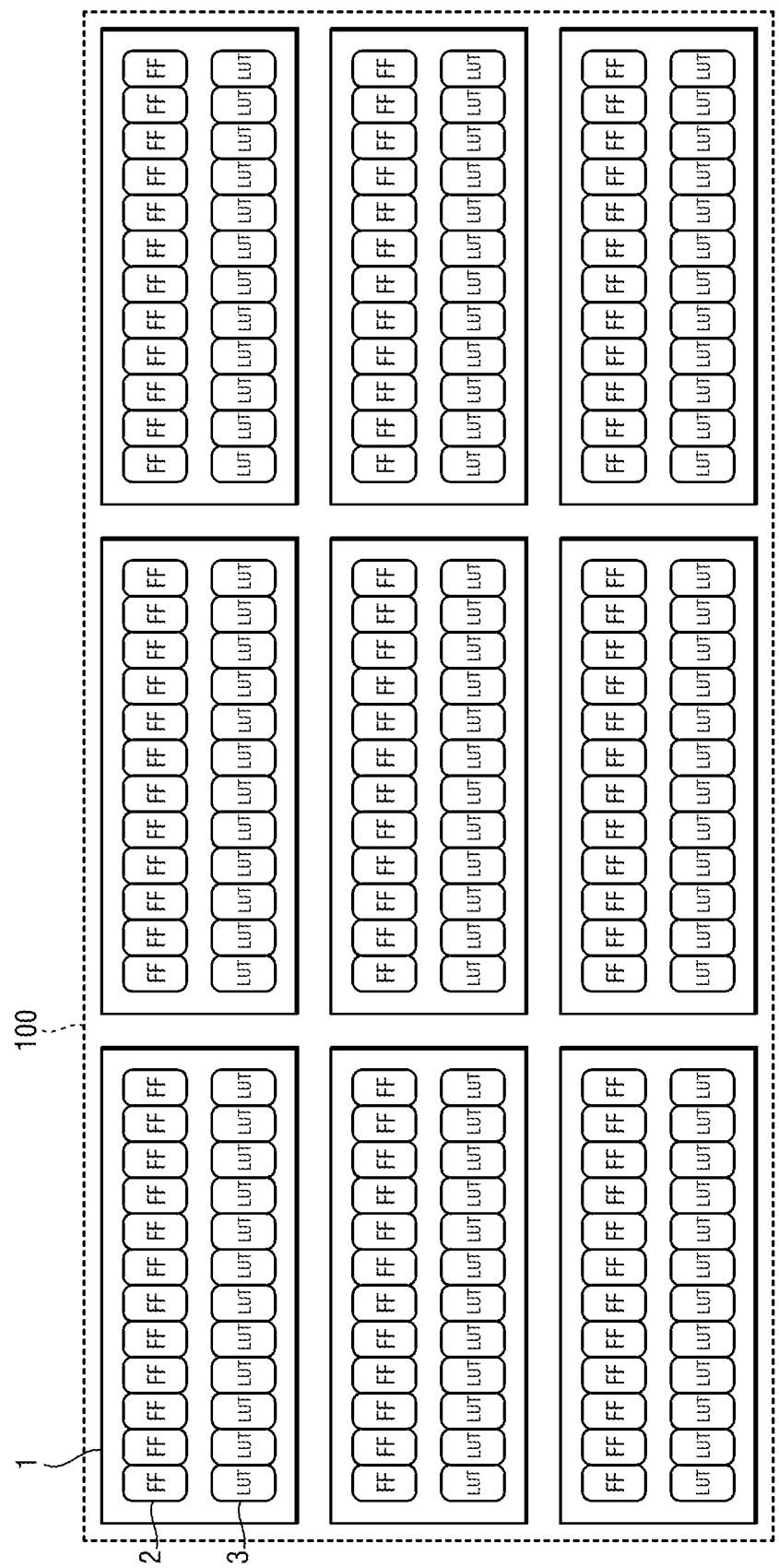
FIG. 1 shows logic groups (or "clusters") of an FPGA.

Thus, in FIG. 1, there can be seen nine logic groups (or "clusters") 1, each logic group 1 containing twelve flip-flop bistables 2, twelve lookup tables (LUTs) 3, and twelve buffers (not shown). This view is purely functional, the physical positions and the sizes of each of these elements being unknown, as is the spacing between the various elements.

The structure of the above-described component serves to illustrate a conventional architecture for an FPGA component. Other FPGA components may be based on different architectures, with groups of logic elements and with bistables of different shapes, sizes, and organizations. Nevertheless, a plurality of memory elements are to be found coupled with a plurality of logic elements. The invention sets out to characterize and then to optimize the use of the plurality of elements present in the FPGA.

The production method of the invention firstly comprises a preliminary characterization stage that is performed on a reference FPGA. The reference FPGA could also be referred to as a "test vehicle".

In this example, the reference FPGA is an FPGA of the IGLOO2 family, similar to the optimized FPGA that is to be produced.

The reference FPGA presents a reference surface including a matrix made up of radiation-sensitive reference elements that are distributed over a majority of the reference surface of the reference FPGA. Where possible, the reference elements should be placed at small distances from one another (i.e. the placement needs to be as dense as possible) in order to ensure better accuracy for the characterization.

In this example, each reference element is a reference register constituted by a flip-flop bistable 2.

The reference FPGA also includes a communication interface enabling each reference register to be filled with data, and enabling the data contained in each reference register to be read.

This communication interface may be an interface of low bandwidth serial type, or it may be a faster interface. The communication interface enables the states of the reference registers to be read back in deterministic manner in order to be able to associate observed errors with positions of reference registers.

The preliminary characterization stage begins with the step of filling (i.e. pre-loading) each reference register of the reference FPGA with known data.

Thereafter, the preliminary characterization stage consists in irradiating the reference FPGA a plurality of times. By way of example, the irradiations may be performed by using a particle accelerator. Thus, over a predetermined duration, the reference FPGA is subjected to radiation capable of causing reference registers to fail. By way of example, the radiation may be proton, neutron, heavy ion, or photon radiation, or it may consist in generating laser radiation, electromagnetic radiation, etc.

After each irradiation, the above-described communication interface is used to read the data contained in the reference registers. The registers that have failed because of the irradiations are then identified, i.e. the reference registers that, after being irradiated, contain data that is different from the known data.

Each error is associated with a failed reference register and with the position of the failed reference register on the reference surface of the reference FPGA.

These operations of pre-loading the registers, of irradiating them, and then of reading them are repeated a large number of times, until the amount of available information is statically sufficient. Typically, these irradiating and reading operations are repeated about one thousand times.

Using this statistical information, the impact of the irradiations on the reference surface of the reference FPGA is mapped.

The mapping makes it possible to identify failure dependency relationships between reference registers that often fail simultaneously (in response to the same irradiation).

At least one "failure group" comprising a plurality of reference registers is thus defined as follows: a failure group is a group such that the probability of at least two reference registers of the failure group failing simultaneously is greater than a predetermined threshold.

Geometrical shapes are then defined, each including reference registers making up a failure group. These geometrical shapes are thus representative of the impact of the irradiations.

Figure 2:
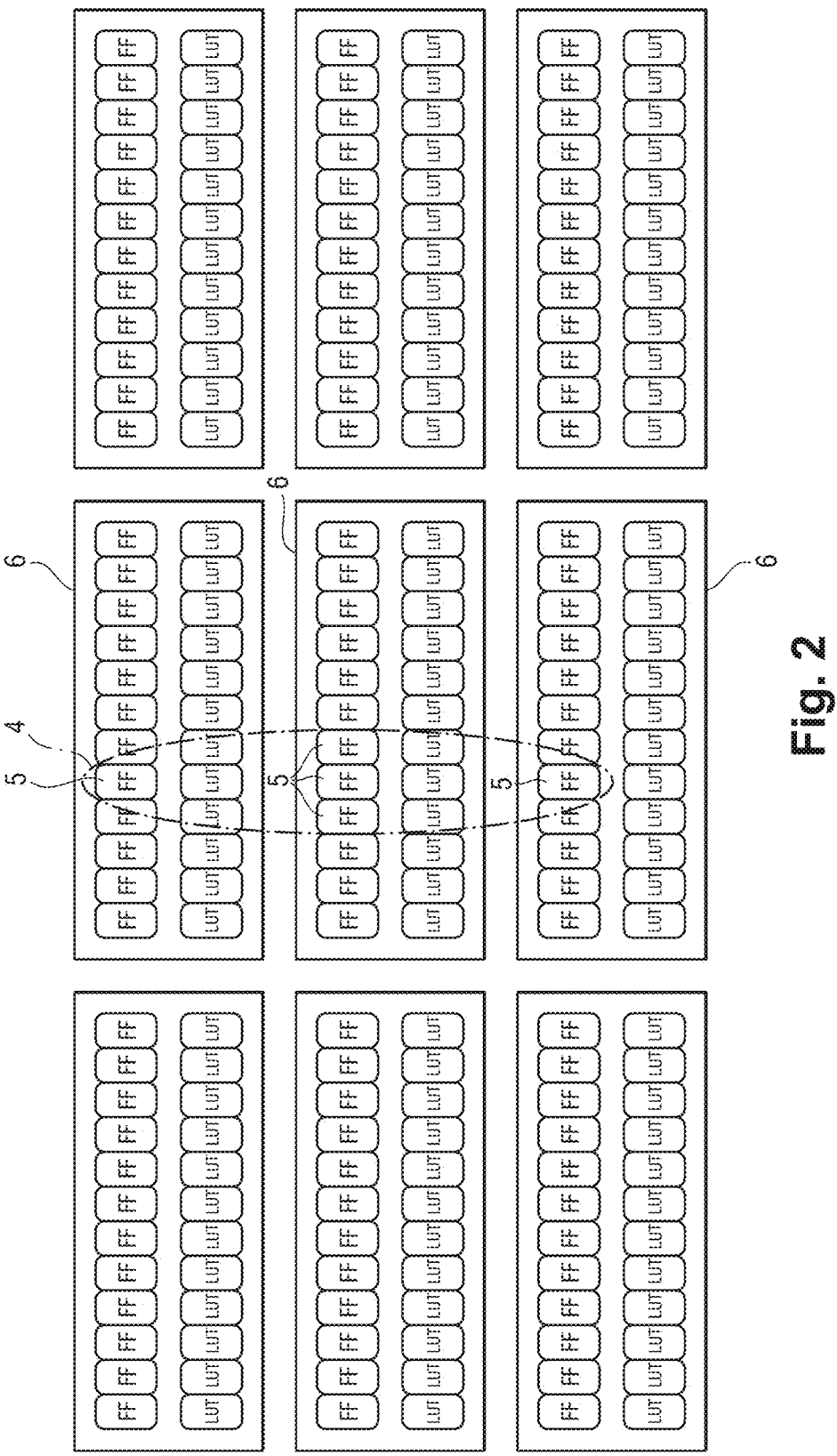
FIGS. 2 to 5 show examples of reference registers that have failed in a reference FPGA.

Thus, in FIG. 2, the geometrical shape 4 contains a failure group of five failed reference registers 5 of the reference FPGA, which failed registers are situated in three different logic groups 6.

Figure 3:
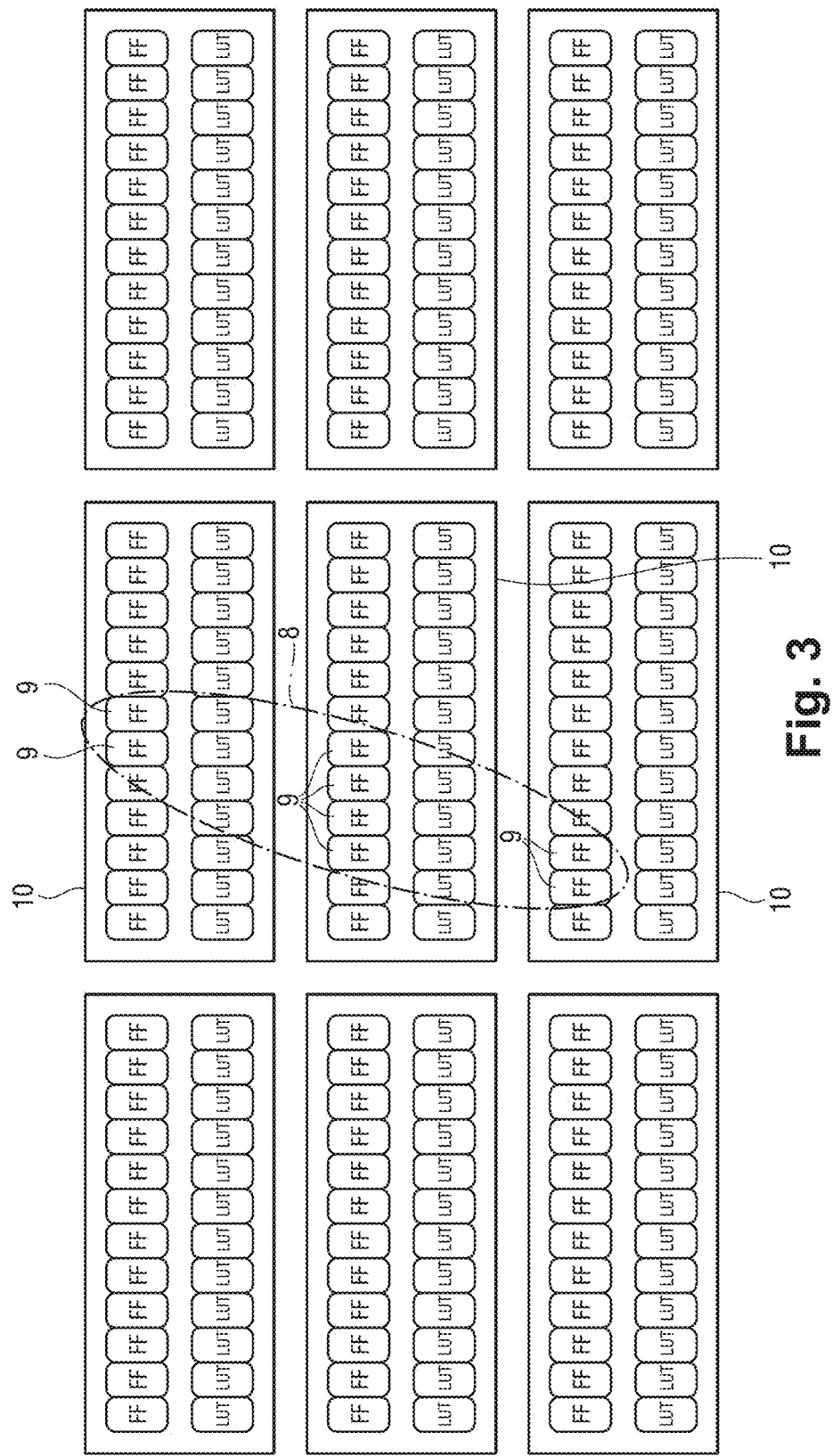

Likewise, in FIG. 3, the geometrical shape 8 contains a failure group of eight failed reference registers 9 that are situated in three different logic groups 10.

Figure 4:
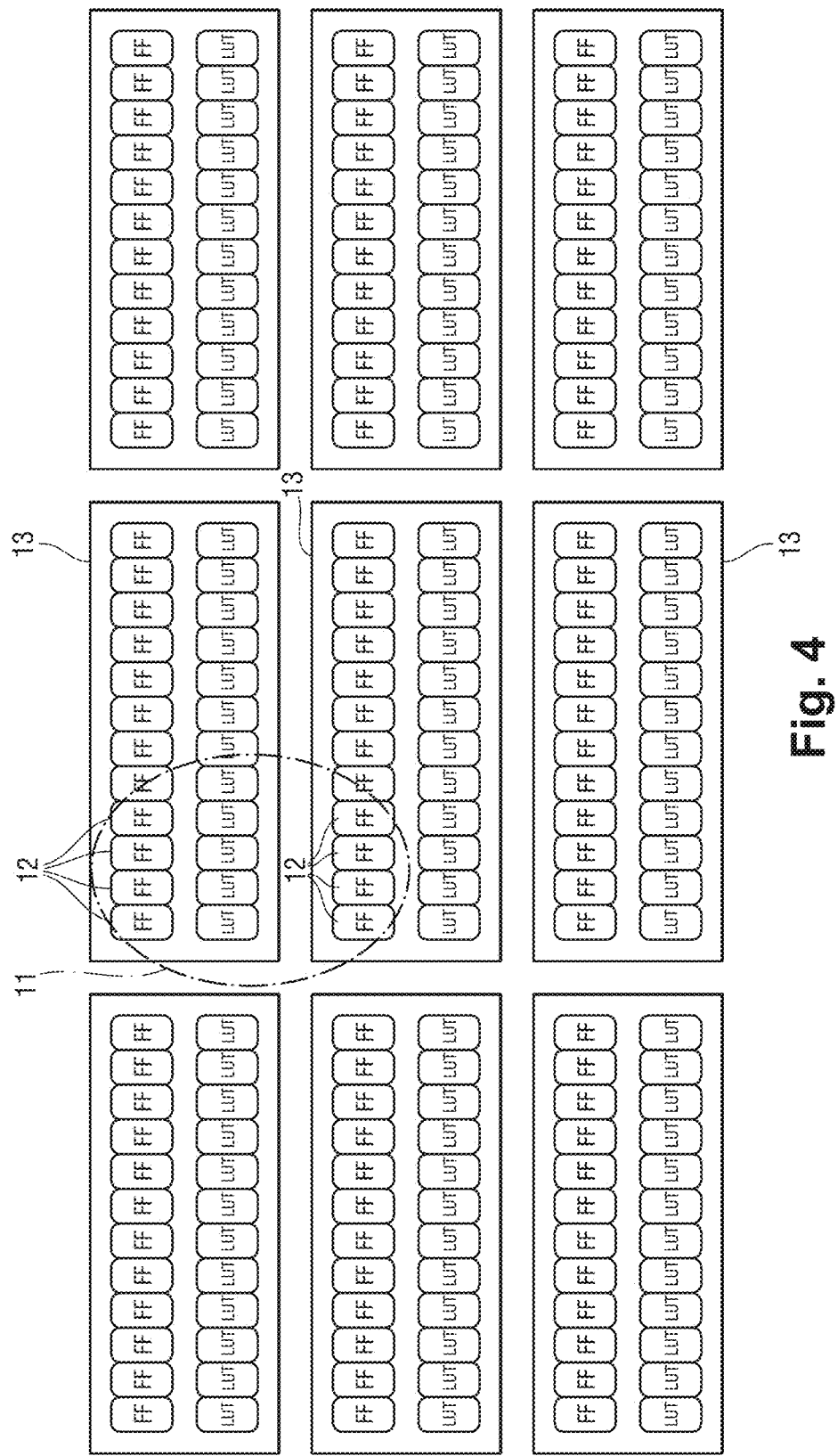

In FIG. 4, the geometrical shape 11 contains a failure group of eight failed reference registers 12 that are situated in two different logic groups 13. The failed reference registers 12 can be grouped together between the two top rows (corresponding to two logic groups 13), but not with the bottom row (corresponding to the logic group situated under the two logic groups 13).

Figure 5:
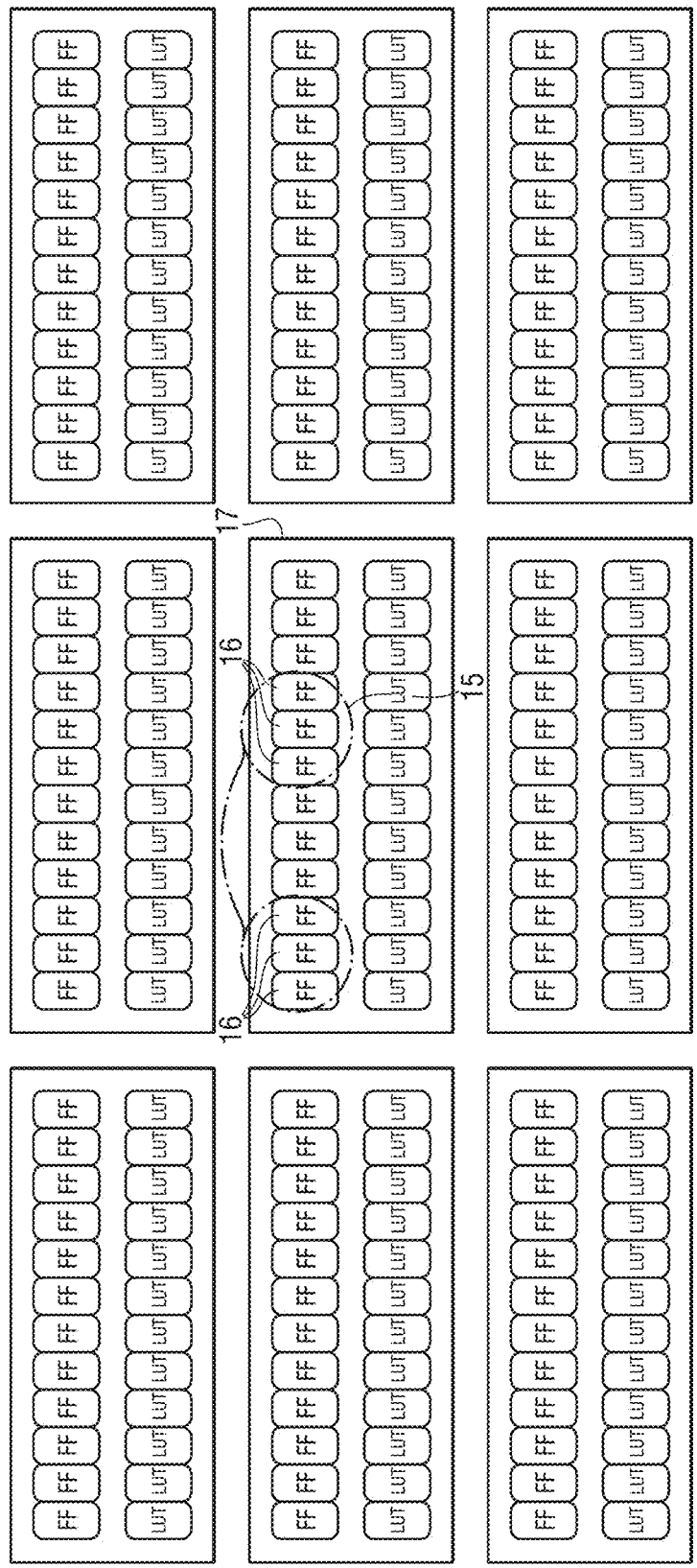

In FIG. 5, the geometrical shape 15 contains a failure group of six failed reference registers 16 that are situated in a single logic group 17. The six failed reference registers 16 appear to be linked by simultaneous failures, even though their logical positions (i.e. within the logic group 17) are not adjacent.

After a sufficient number of irradiation and read operations, the mapping enables simultaneous failures around a particular reference register to be evaluated statistically.

In the event of a particular reference element of the reference FPGA failing, the probability of at least one other reference element failing simultaneously is estimated as a function of the positions of the particular reference element and of the other reference element.

This step is illustrated with reference to FIGS. 6 to 9.

Figure 6:
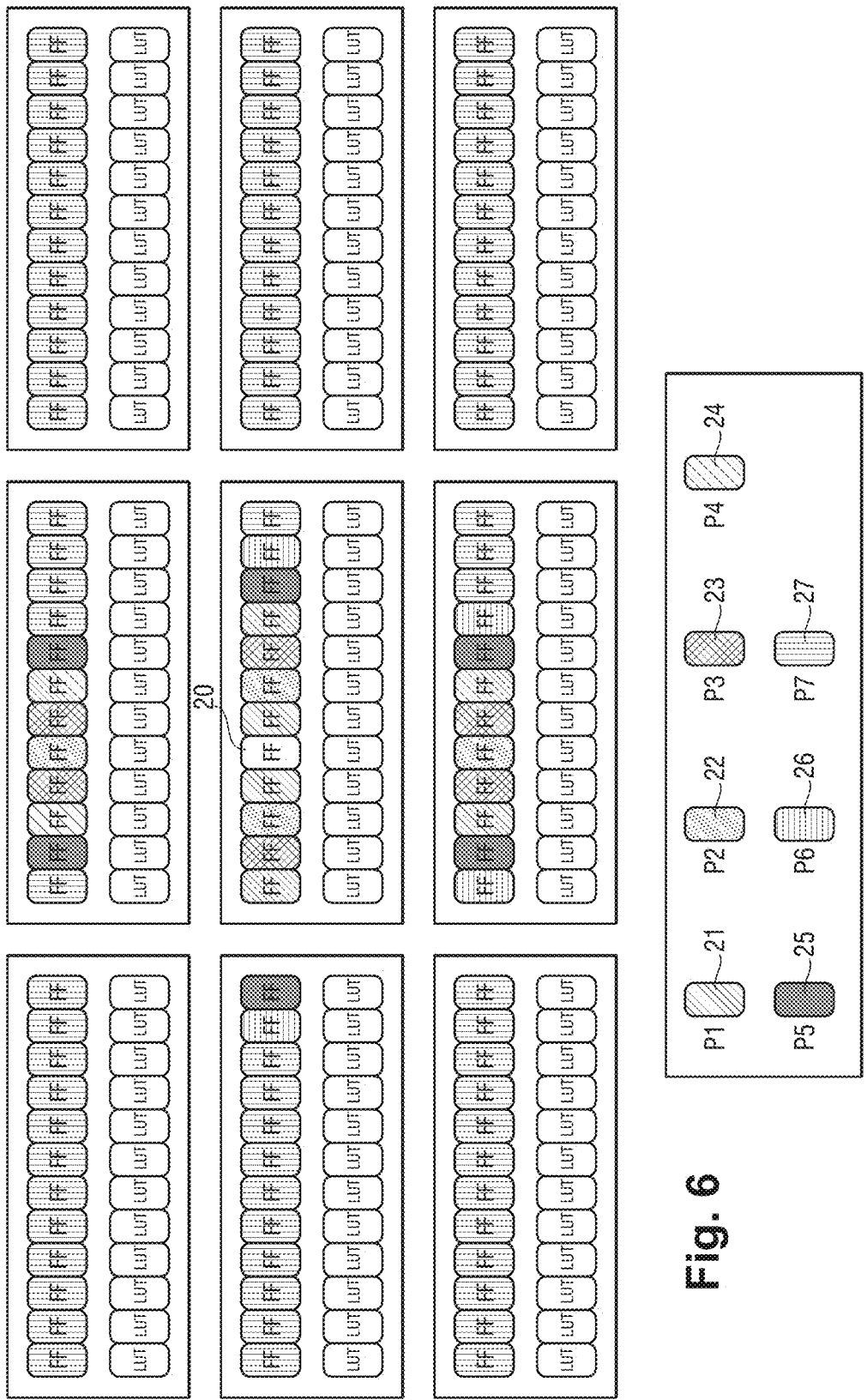
FIGS. 6 to 9 show examples of simulated failure probability distributions between a particular reference register and other reference registers situated in its proximity.

With reference to FIG. 6, the reference registers are associated with a plurality of shading patterns that are defined in order to visualize the probability of simultaneous failure. For a particular failed reference register 20, each shading pattern 21 to 27 illustrates the probability of the reference register that is associated with said shading pattern 21 to 27 failing simultaneously. The probability of simultaneous failure associated with the shading pattern 21 is written P1, the probability of simultaneous failure associated with the shading pattern 22 is written P2, the probability of simultaneous failure associated with the shading pattern 23 is written P3, the probability of simultaneous failure associated with the shading pattern 24 is written P4, the probability of simultaneous failure associated with the shading pattern 25 is written P5, the probability of simultaneous failure associated with the shading pattern 26 is written P6, and the probability of simultaneous failure associated with the shading pattern 27 is written P7.

Specifically:
$P1 \geq P2 \geq P3 \geq P4 \geq P5 \geq P6 \geq P7$.

Thus, in FIG. 6, there can be seen a probability of simultaneous failure deincreases with increasing distance between the particular reference register 20 and another reference register.

Figure 7:
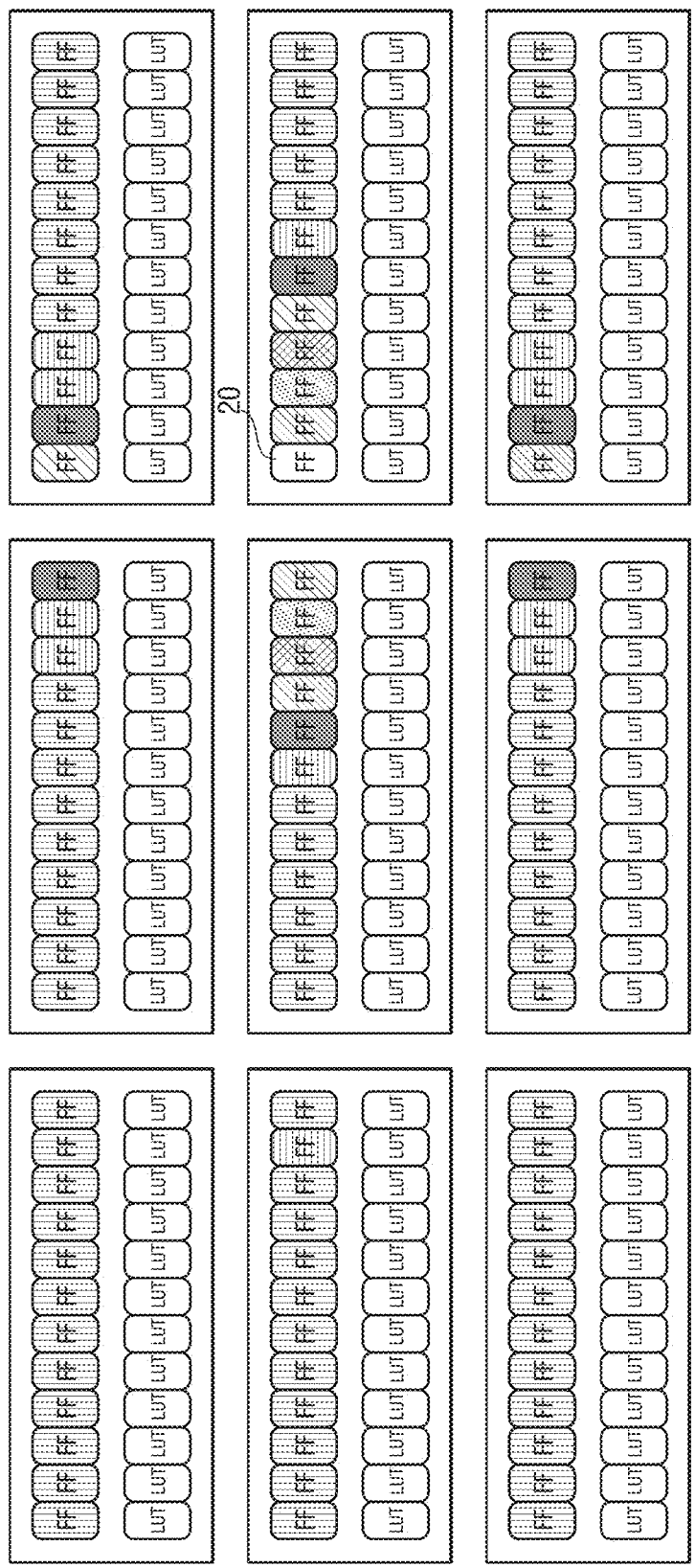

In FIG. 7, asymmetry can be seen between the vertical and horizontal directions. The probability of simultaneous failure decreases much more quickly in the vertical direction than in the horizontal direction.

Figure 8:
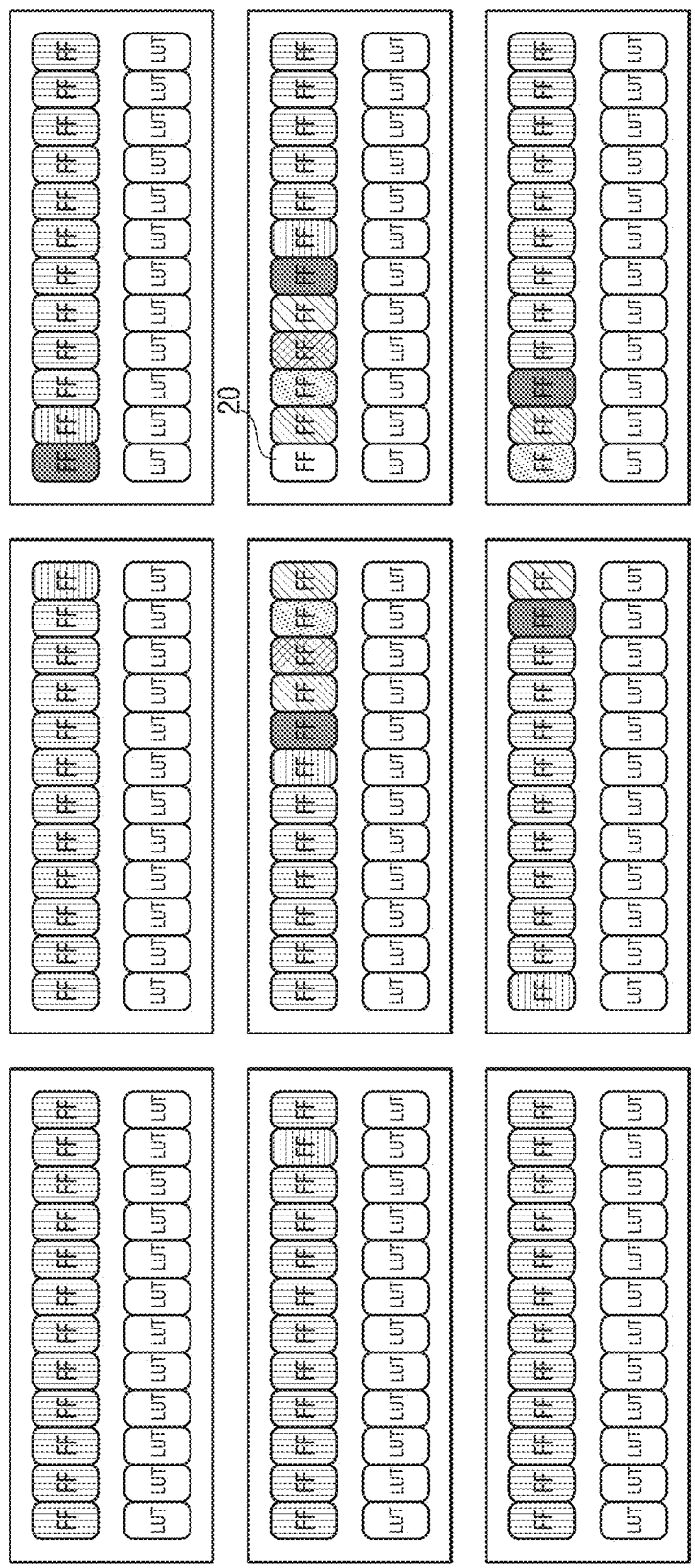

In FIG. 8, asymmetries can be seen between successive rows (or logic groups), or between "even" and "odd" rows. In this example, the reference registers of the central row and of the bottom row present probabilities of failing simultaneously that are greater than the probabilities of the central row and of the top row failing simultaneously.

Figure 9:
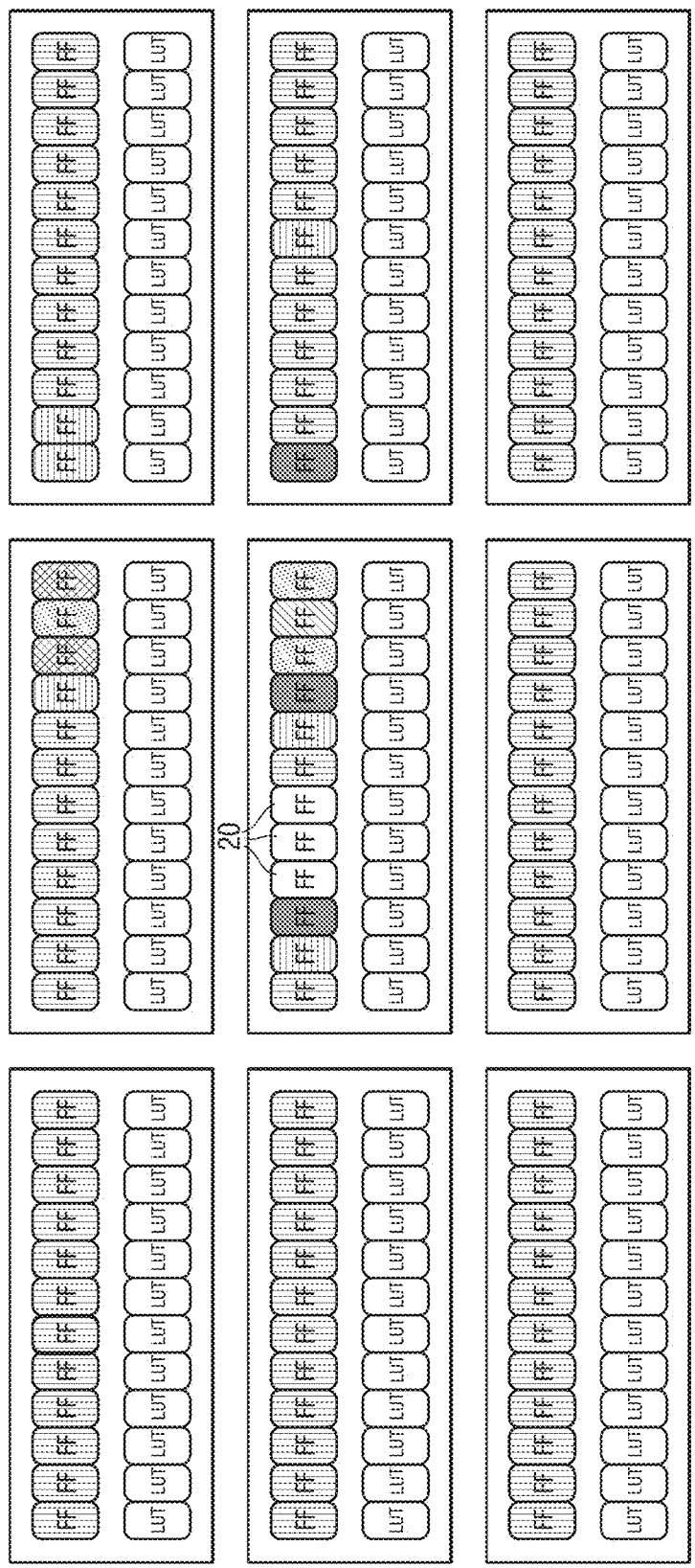

In FIG. 9, there can be seen a situation in which there is a difference between the "theoretical" geometrical structure of the reference FPGA and its "real" geometrical structure. Reference registers with a probability of failing simultaneously can be seen to be grouped together in groups of nine registers and not in groups of twelve (like a logic group or "cluster").

Using the results obtained during the preliminary characterization stage, it is thus possible to calculate the probability of reference registers failing simultaneously.

Thus, when implementing techniques for hardening the FPGA, e.g. when using redundancy of the triple modular redundancy type, or indeed when using error correction coding, it is possible to calculate the probability of suffering a failure despite the countermeasures that are in place (i.e. a failure that the hardening technique cannot correct or cannot detect).

It is thus possible to evaluate the residual sensitivity of a reference FPGA in which one or more hardening techniques are implemented.

For example, for each of the three reference registers in the same TMR cell positioned in the FPGA component, the mapping is used to determine the probability of two or three reference registers failing at the same time (which leads to the TMR cell as a whole being faulty).

For example, when using an error correction code capable of correcting one error in a 32-bit word, the information about the positions of the 32 bits in the FPGA and the mapping are used to determine the probability of two or more reference registers in the word failing simultaneously in order to determine the resulting probability of failure.

Once this calculation has been performed for the entire reference FPGA or for a determined function, a global probability of failure is deduced.

The production method then consists in using the results obtained during the preliminary characterization stage, as performed on the reference FPGA, to produce one or more FPGAs optimized in terms of protection against radiation.

An optimized FPGA has an optimized surface on which optimized radiation-sensitive elements are distributed. The optimized radiation-sensitive elements are optimized registers of the optimized FPGA. The positions of the optimized registers on the optimized surface of the optimized FPGA correspond to the positions of the reference registers on the reference surface of the reference FPGA.

When a target is given concerning the global probability of failure of the optimized FPGA or of a determined function, the placement of the optimized registers is modified in order to approach the desired value.

For each optimized FPGA that is produced, the production method thus includes an optimization stage comprising the step of adapting the programming of the optimized FPGA as a function of the mapping obtained from the reference FPGA.

Adapting the programming comprises the step of adapting the position of at least one optimized register on the optimized surface of the optimized FPGA.

This ensures that two optimized registers of the optimized FPGA that co-operate within the same function do not present positions that correspond to the positions of two reference registers of the reference FPGA that belong to a common failure group.

The optimized FPGA is programmed for operational needs.

Figure 10:
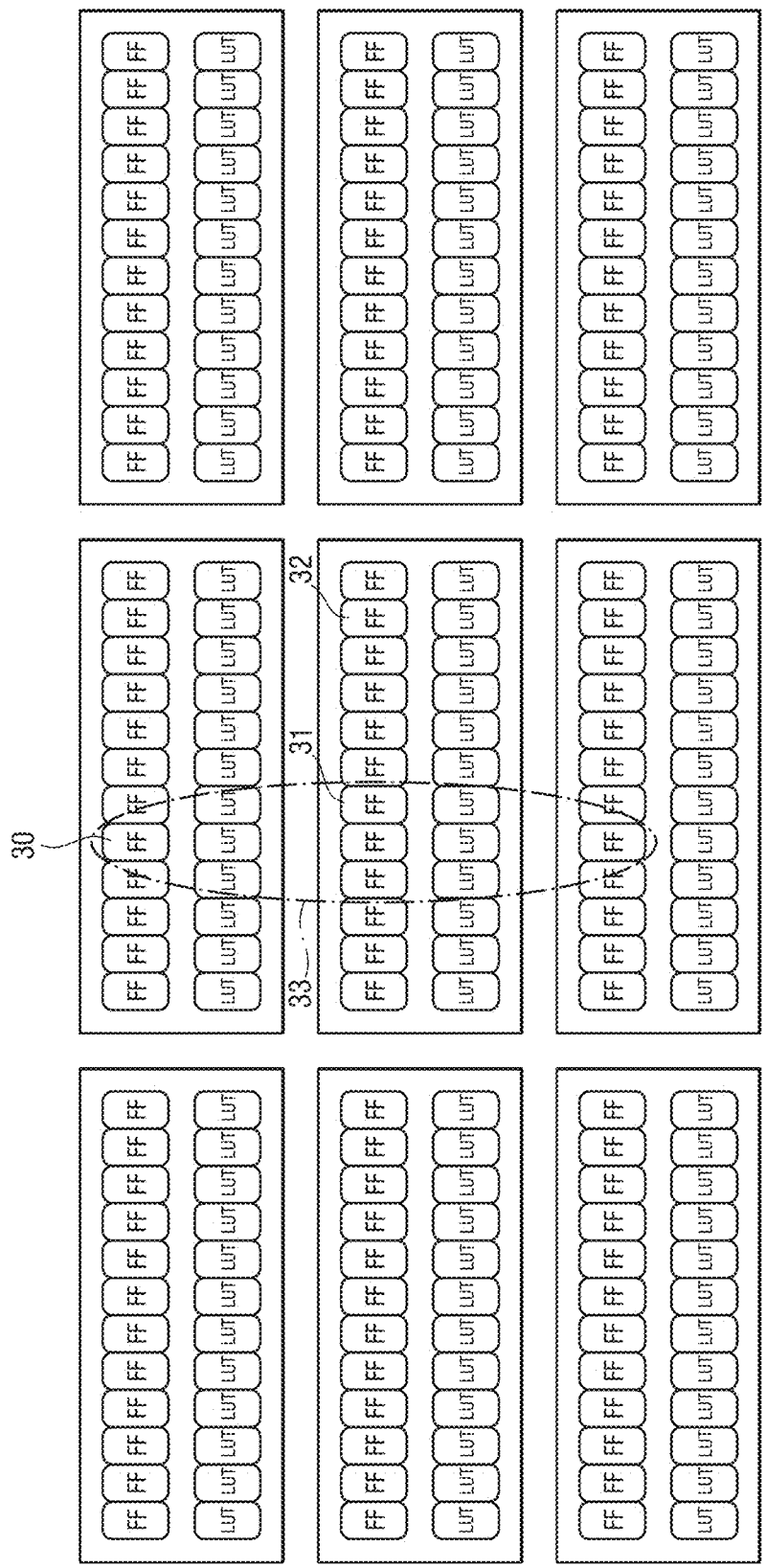
FIGS. 10 to 13 show geometrical shapes including failure groups, and optimized registers of an optimized FPGA co-operating to perform the same function.

With reference to FIG. 10, the above is illustrated by a first example. A TMR cell of a non-optimized FPGA has a first register 30, a second register 31, and a third register 32. The first register 30, the second register 31, and the third register thus co-operate to implement the same function, which is a hardening function seeking to harden the FPGA against radiation. The hardening function is triple modular redundancy.

The first register 30 and the second register 31 present positions that correspond to the positions of two reference registers of the reference FPGA that both belong to the same failure group included in the geometrical shape 33, thereby jeopardizing the effectiveness of the protection.

In the event of the first register 30 failing, it is thus estimated that the probability of the second register 31 failing simultaneously is high.

The positions of the first and second registers are thus adapted as a function of this high probability of simultaneous failure. The positions of the first and second registers are adapted so as to avoid having any two registers from among the first, second, and third registers belonging to the same failure group. This ensures that each register from among the first, second, and third registers fails in independent manner.

Likewise, when the hardening function is error correction coding, it is ensured that two registers used for storing portions (bits) of a single word are not to be found in the same failure group.

Figure 11:
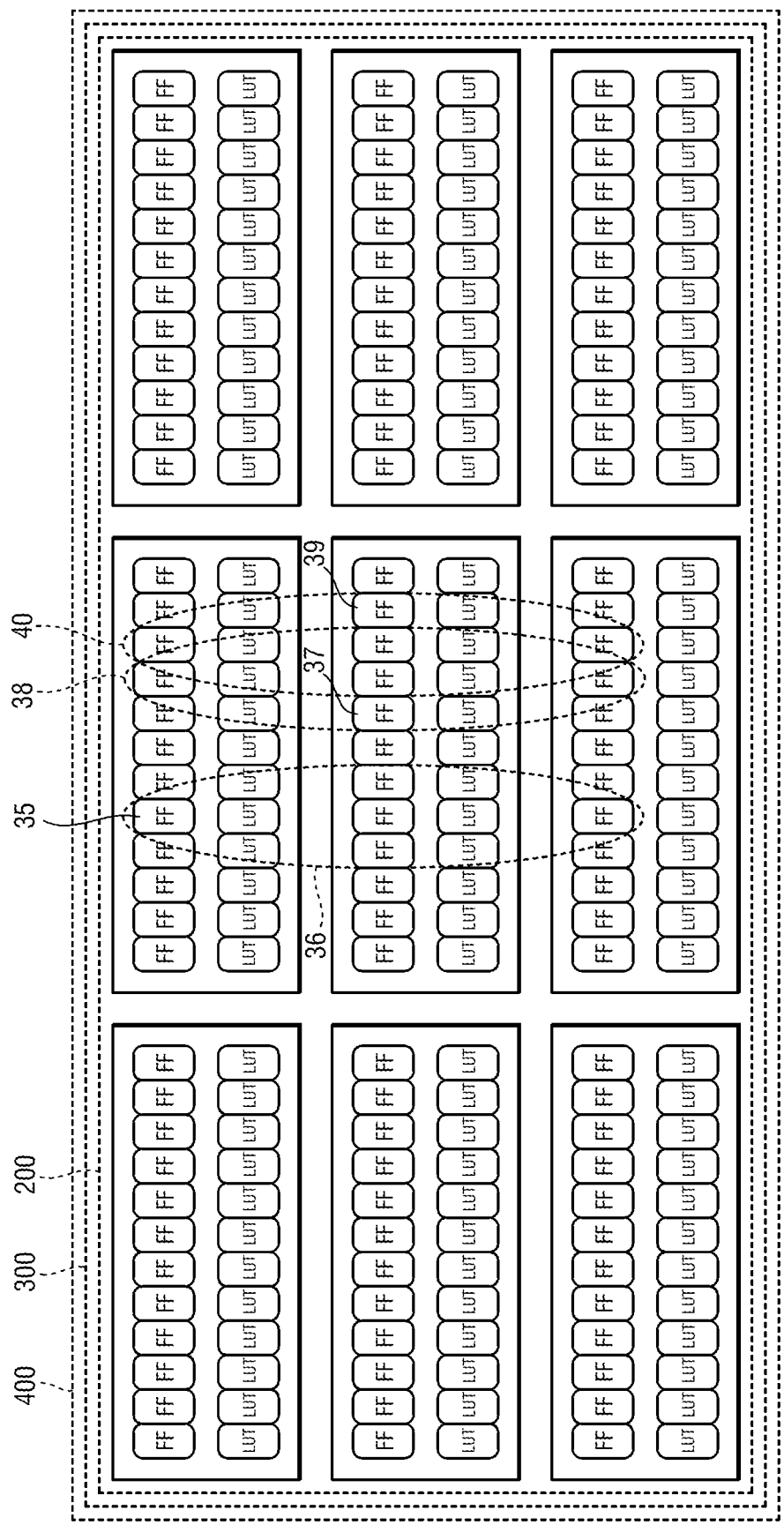

Thus, with reference to FIG. 11, an optimized FPGA is obtained having a first optimized register 35 in a position that corresponds to a reference register belonging to a first failure group included in the geometrical shape 36, a second optimized register 37 in a position that corresponds to a reference register belonging to a second failure group included in the geometrical shape 38, and a third optimized register 39 in a position that corresponds to a reference register belonging to a third failure group included in the geometrical shape 40. The first optimized register 35, the second optimized register 37, and the third optimized register 39 therefore cannot fail simultaneously under the effect of a single radiation event, with a probability that is known and determined by the threshold simultaneous failure probability that was used for defining the failure groups.

Figure 12:
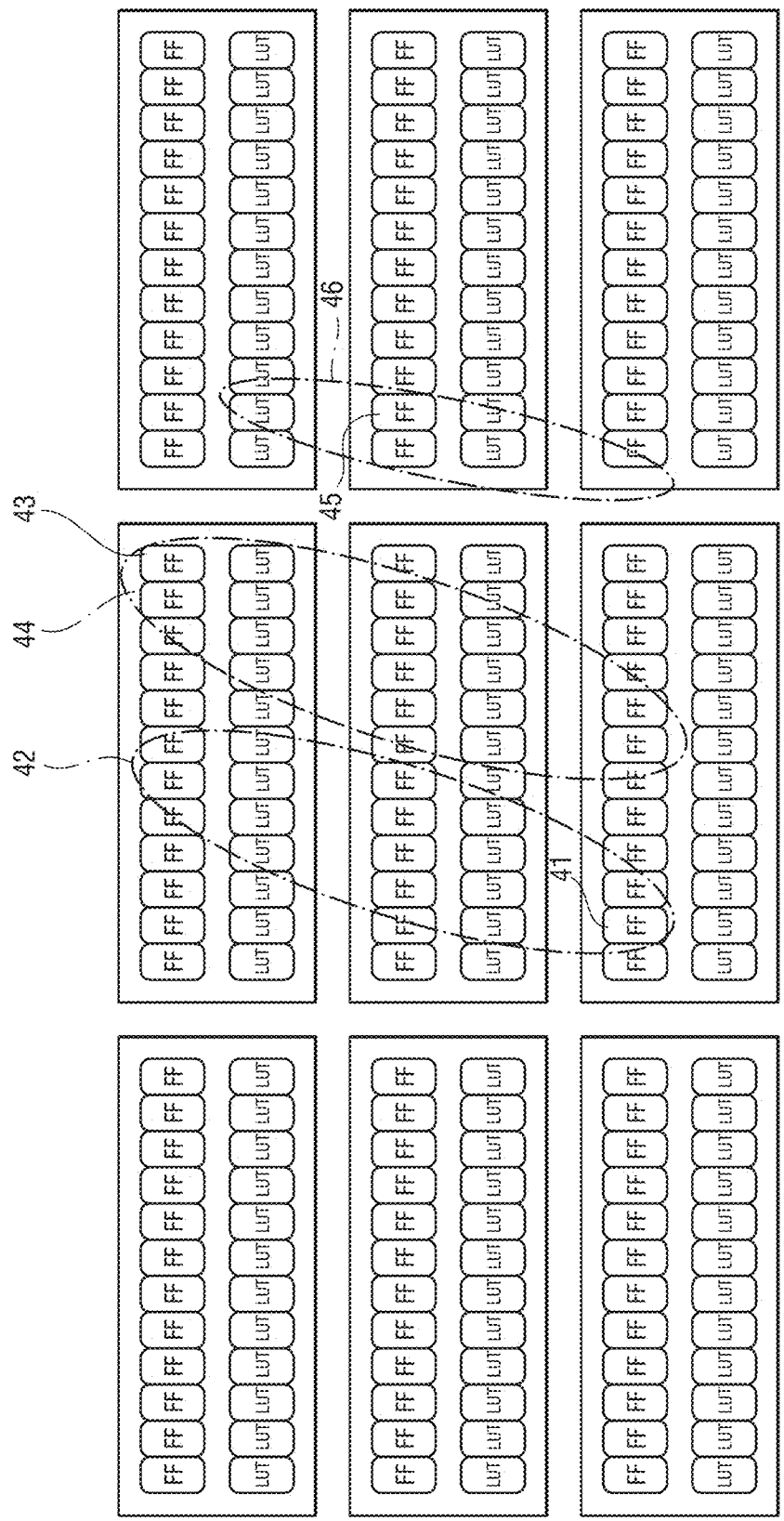

Likewise, with reference to FIG. 12, an optimized FPGA is obtained having a first optimized register 41 in a position that corresponds to a reference register belonging to a first failure group included in the geometrical shape 42, a second optimized register 43 in a position that corresponds to a reference register belonging to a second failure group included in the geometrical shape 44, and a third optimized register 45 in a position that corresponds to a reference register belonging to a third failure group included in the geometrical shape 46. The first optimized register 41, the second optimized register 43, and the third optimized register 45 therefore cannot fail simultaneously.

Figure 13:
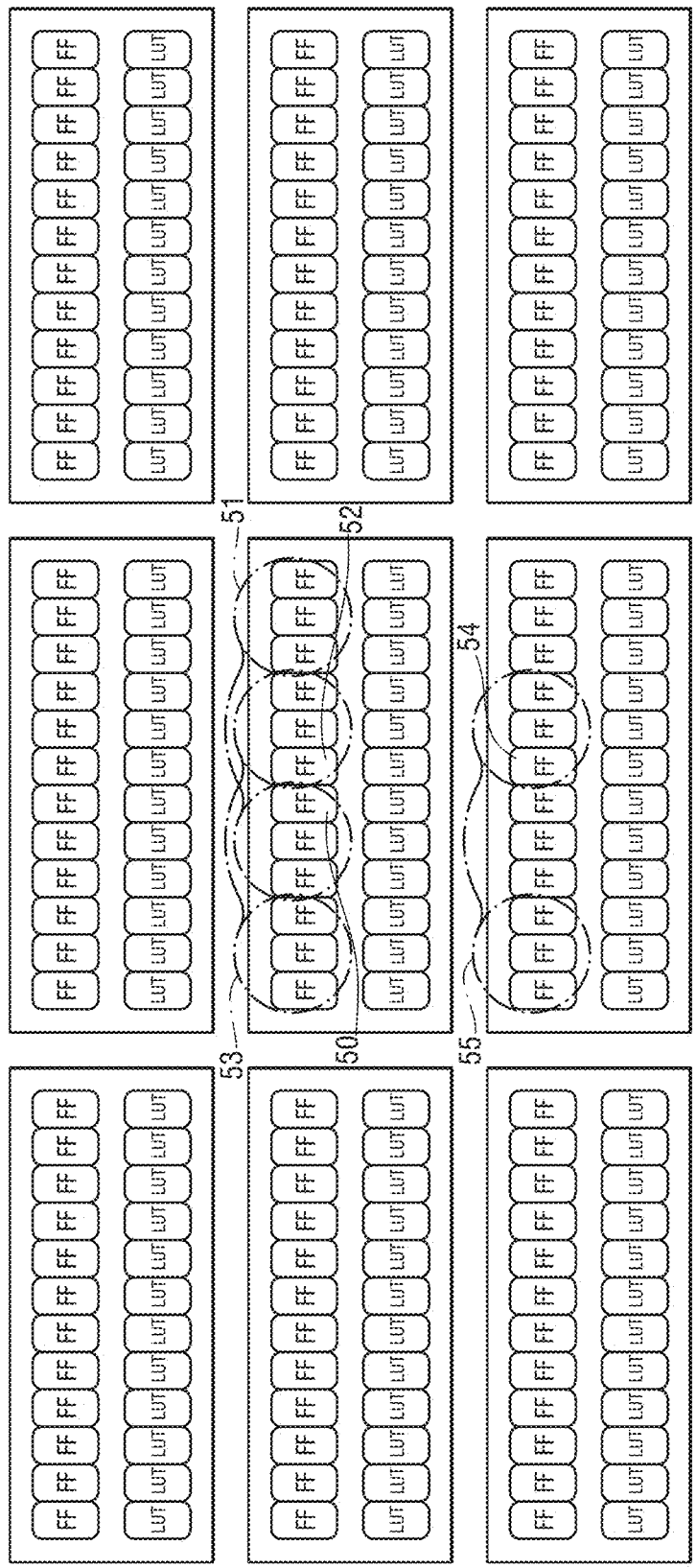

Likewise, with reference to FIG. 13, an optimized FPGA is obtained having a first optimized register 50 in a position that corresponds to a reference register belonging to a first failure group included in the geometrical shape 51, a second optimized register 52 in a position that corresponds to a reference register belonging to a second failure group included in the geometrical shape 53, and a third optimized register 54 in a position that corresponds to a reference register belonging to a third failure group included in the geometrical shape 55. The first optimized register 50, the second optimized register 52, and the third optimized register 54 therefore cannot fail simultaneously. In this example, it can be seen as a result of evaluating the geometry of failures, it is possible to keep two sensitive optimized registers 50 and 52 together virtually in the placement without those optimized registers being close together from a radiation-failure point of view.

Figure 14:
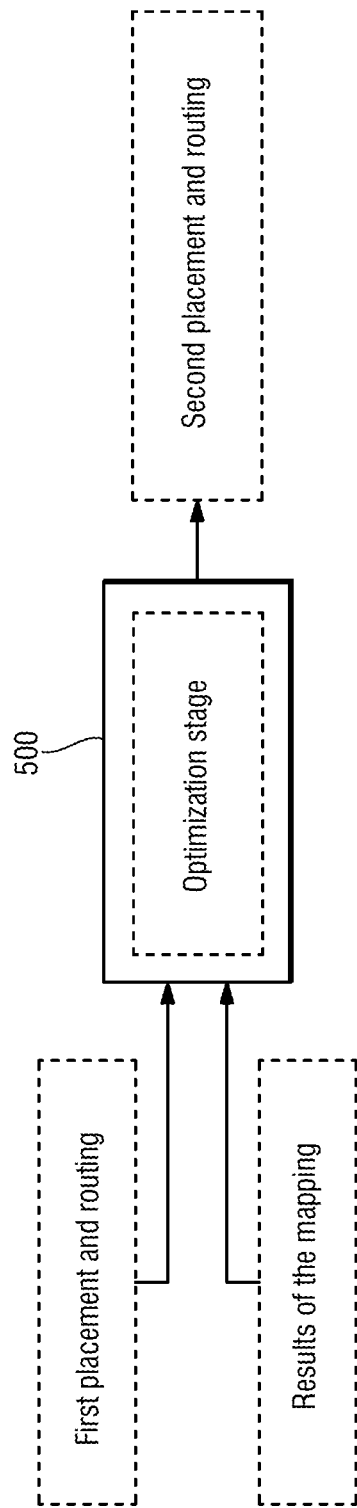
FIG. 14 illustrates a routing tool 500.

In order to adapt the positioning of the optimized registers in the manner described above, it may be necessary to modify the placement as performed automatically by the placement and routing tool 500 (see FIG. 14) that is used.

In this example, the placement of optimized registers in the optimized circuit comprises two steps.

A first step consists in forming a first placement and routing layout automatically using a conventional placement and routing tool. The first placement and routing layout is optimized for performance targets concerning calculation and power consumption.

A second step consists in modifying that first placement and routing layout by the method as described above for the purpose of obtaining a second placement and routing layout that is optimized for targets concerning withstanding radiation.

In this manner, a solution can be found quickly that satisfies all of the constraints, both functional (calculation and power consumption performance) and also associated with withstanding radiation.

The second placement and routing layout is delivered by a new placement and routing tool that is arranged to acquire the first placement and routing layout, and also the results of the mapping, and to perform the optimization stage of the production method of the invention.

By way of example, in the FPGA of the IGLOO2 family, it is possible merely to apply permutations between the bistables of a single logic group or between the bistables of two different logic groups in order to space apart the elements belonging to a single TMR cell. Elements belonging to a single TMR cell are spaced apart in the sense of the failure mapping and not merely in terms of placement coordinates.

It should be observed that the production method of the invention makes it possible to achieve and justify levels of fault-withstanding performance that cannot be achieved by commercially-available automatic placement software on a component or on commercial technology that is not hardened. Specifically, commercially available automatic placement tools satisfy other targets, in particular concerning power consumption and performance (usable operating frequencies).

The effort that needs to be made in order to reach and justify levels of fault-withstanding performance is less than that needed for the complex simulations of the prior art.

Nevertheless, a computer program for performing the production method of the invention can be incorporated directly in such commercially available placement tools, in order to enable the design to be hardened automatically.

The ability of the production method of the invention to demonstrate or reveal sensitive elements in groupings of repetitive geometrical shapes on a commercial component is also a valuable asset in the context of a robustness approach.

Naturally, the invention is not limited to the embodiment described, but covers any variant coming within the ambit of the invention as defined by the claims.

Above, the FPGAs are IGLOO2 FPGAs, however some other type of FPGA could naturally be used.

The reference circuit 100 (see FIG. 1) and the optimized circuit need not necessarily be FPGAs, but could, by way of example, be optionally-programmable ASICs, or other optionally-programmable logic circuits.

With an ASIC, it is directly while designing the ASIC that it is possible to act on the positions of the sensitive elements. Under such circumstances, a test vehicle would be a test chip with dense placement of the sensitive elements, while the optimized component would be an operational design in which placement takes account of the results of measurements performed on the test chip.

The reference circuit and the optimized circuit need not necessarily be logic circuits, they could equally well be analog circuits of any kind.

There could be a plurality of reference surfaces and not only one, and there could be a plurality of optimized surfaces and not only one: this applies in particular for circuits made up of a stack of multiple dies or of multiple dies interconnected in a single package.

The reference circuit is not necessarily identical to the optimized circuit prior to being optimized: by way of example, the reference circuit could be a circuit of the same family, or it could present the same architecture and make use of fabrication technology that is identical or similar in terms of the materials used and the shapes produced.

The radiation-sensitive elements need not necessarily be registers, each formed by a bistable. The sensitive elements could be registers made up of a plurality of bistables, or indeed of the other elements such as logic elements, volatile or non-volatile memory locations, light emitters (light emitting diodes (LEDs)), light receivers (photodiodes), or at low level, the transistors of a digital or analog circuit. The sensitive elements could equally well correspond to elements that are more complex, e.g. such as the neurons of a neural network on a chip, the calculation cores of a graphics processor unit (GPU), the processor cores of a massively parallel or "many-core" system.

There is also provided an electric circuit card 200 including an optimized circuit as described above.

There is also provided an inertial measurement unit 300 including an electric circuit card as mentioned above, and also a navigation system 400 including the inertial measurement unit.

It should be observed that the production method of the invention may be performed in a mass-production context, in order to produce a potentially large quantity of optimized circuits. The production method may also be performed in order to produce a small number of optimized circuits, e.g. for experimental purposes.

The invention claimed is:

1. A production method for producing a circuit optimized to be protected against radiation, the production method including a preliminary characterization stage performed on a reference circuit comprising at least one reference surface on which radiation-sensitive reference elements are distributed, the preliminary characterization stage comprising the steps of:
   irradiating the reference circuit a plurality of times;
   after each irradiation, if one or more reference elements of the reference circuit have failed, locating said reference element(s); and
   mapping the impact of the irradiations on the reference surface of the reference circuit;
   the production method further including an optimization stage comprising the step of adapting the position of at least one optimized radiation-sensitive element on at least one optimized surface of the optimized circuit as a function of the mapping performed on the reference circuit.

2. The production method according to claim 1, wherein in the event of a particular reference element of the reference circuit failing, the mapping comprises the step of estimating the probability of at least one other reference element failing simultaneously as a function of the positions of the particular reference element and of the other reference element.

3. The production method according to claim 1, wherein the mapping comprises the step of defining at least one failure group comprising a plurality of reference elements of the reference circuit, the failure group being such that the probability of simultaneous failure of at least two reference elements of the failure group is greater than a predetermined threshold.

4. The production method according to claim 3, wherein the optimization stage comprises the step of ensuring that two optimized elements of the optimized circuit that co-operate within a common function do not present positions corresponding to the positions of two reference elements of the reference circuit that belong to the same failure group.

5. The production method according to claim 4, wherein the function is a hardening function seeking to harden the optimized circuit against radiation.

6. The production method according to claim 5, wherein the hardening function is triple modular redundancy.

7. The production method according to claim 5, wherein the hardening function is error correction coding.

8. The production method according to claim 1, wherein each reference element is a reference register made up of one or more bistables, the preliminary characterization stage including the step, performed prior to the irradiations, of filling each reference register of the reference circuit with known data, a failed reference register being identified by detecting a reference register that contains data different from the known data.

9. A placement and routing tool arranged to acquire a first placement and routing and also the results of the mapping performed in the production method according to claim 1, the placement and routing tool also being arranged to perform on the first placement and routing the optimization stage of the production method, so as to obtain a second placement and routing.

10. The placement and routing tool according to claim 9, the placement and routing tool being arranged to perform placement and routing of an FPGA.

11. The placement and routing tool according to claim 9, the placement and routing tool being arranged to perform placement and routing of an ASIC.

12. An optimized circuit produced using a production method, the production method including a preliminary characterization stage performed on a reference circuit comprising at least one reference surface on which radiation-sensitive reference elements are distributed, the preliminary characterization stage comprising the steps of:
  irradiating the reference circuit a plurality of times;
  after each irradiation, if one or more reference elements of the reference circuit have failed, locating said reference element(s); and
  mapping the impact of the irradiations on the reference surface of the reference circuit the production method further including an optimization stage comprising the step of adapting the position of at least one optimized radiation-sensitive element on at least one optimized surface of the optimized circuit as a function of the mapping performed on the reference circuit.

13. The optimized circuit according to claim 12, comprising optimized elements arranged to perform a plurality of functions, the optimized circuit being such that, for each function, two optimized elements co-operating within said function are positioned in positions that correspond to the positions of two reference elements of the reference circuit that belong to different failure groups.

14. The optimized circuit according to claim 12, the optimized circuit being an FPGA or an ASIC.

15. The optimized circuit according to claim 12, the optimized circuit being an analog circuit.

* * * * *